(12) United States Patent
Wang et al.

(10) Patent No.: US 7,808,565 B2
(45) Date of Patent: Oct. 5, 2010

(54) LIQUID CRYSTAL DISPLAY AND ACTIVE MATRIX SUBSTRATE THEREOF

(75) Inventors: Wen-Chun Wang, Taichung (TW); Chin-Chang Liu, Taichung (TW)

(73) Assignee: Wintek Corporation, Taichung (TW)

( * ) Notice: Subject to any disclaimer, the term of this patent is extended or adjusted under 35 U.S.C. 154(b) by 385 days.

(21) Appl. No.: 12/101,156

(22) Filed: Apr. 11, 2008

(65) Prior Publication Data
US 2008/0252802 A1 Oct. 16, 2008

(30) Foreign Application Priority Data
Apr. 12, 2007 (TW) ............................... 96112823 A (51) Int. Cl.
*G02F 1/141* (2006.01)
*G09G 3/36* (2006.01)
(52) U.S. Cl. .......................................... 349/37; 345/96
(58) Field of Classification Search .................. 349/37, 349/38, 39; 345/87, 96, 103
See application file for complete search history.

(56) References Cited
U.S. PATENT DOCUMENTS 6,822,724 B2  11/2004  Ogishima et al.
6,839,104 B2  1/2005  Taniguchi et al.
2004/0041770 A1  3/2004  Kubo et al.
2008/0246898 A1*  10/2008  Lee et al. ...................... 349/37
2010/0026921 A1*  2/2010  Tsubata ........................ 349/37

* cited by examiner

*Primary Examiner*—David Nelms
*Assistant Examiner*—David Y Chung
(74) *Attorney, Agent, or Firm*—Jianq Chyun IP Office (57) ABSTRACT

An active matrix substrate is provided. The active matrix substrate includes a substrate, scan lines, data lines, and pixel units. The scan lines, data lines, and pixel units are all disposed over the substrate. The pixel unit includes an active component, a pixel electrode, and an auxiliary electrode. The active components are electrically connected with the scan lines and data lines. The pixel electrode has openings extended from the edge of the pixel electrode to the interior of the pixel electrode. The auxiliary electrode is electrically connected with the pixel electrode controlled by a previous scan line and includes a body portion and extending portions disposed in the openings. The pixel electrode is electrically connected with the auxiliary electrode of a pixel unit controlled by a next scan line.

32 Claims, 9 Drawing Sheets

LIQUID CRYSTAL DISPLAY AND ACTIVE MATRIX SUBSTRATE THEREOF

CROSS-REFERENCE TO RELATED APPLICATION

This application claims the priority benefit of Taiwan application serial no. 96112823, filed on Apr. 12, 2007. The entirety of the above-mentioned patent application is hereby incorporated by reference herein and made a part of this specification.

BACKGROUND OF THE INVENTION

1. Field of the Invention

The present invention is directed to a liquid crystal display (LCD) panel and an active matrix substrate thereof, and more particularly to an LCD panel with wide viewing angle and an active matrix substrate thereof.

2. Description of Related Art

Nowadays, the functions that the market demands of the thin film transistor liquid crystal display (TFT-LCD) tend to be high contrast ratio, high luminance, quick response and wide viewing angle. Currently, the technologies that meet the requirement of wide viewing angle include, for example, the twisted nematic (TN) LCD with a wide viewing film, the in-plane switching (IPS) LCD, the fringe field switching (FFS) LCD and a multi-domain vertical alignment (MVA) TFT-LCD. In the conventional MVA-LCD panel, since alignment protrusions or slits formed on the color filter substrate or the TFT array substrate can render the liquid crystal molecules arranged in multiple directions, thereby achieving multi-domain. Therefore, the MVA-LCD panel can meet the requirement of wide viewing angle. However, the technique of achieving multi-domain by the said slits often results in greater instability of the multi-domain because the tilted electric field generated by the slits is weaker in its intensity.

Moreover, although the conventional MVA-LCD panel meets the requirement of wide viewing angle, it has the problem of color shift. The so-called color shift means users would see an image having gray scales different from the original image when viewing the images on the display device from different viewing angles. For example, users would see an image lighter than the original image if viewing from a large angle. The problem of color shift would deteriorate the display quality of the image. In order to solve the problem of color shift, some solutions have been proposed, and one of the solutions is forming an additional capacitor in one single pixel unit. By electrical coupling, the capacitor makes a pixel electrode within the single pixel unit generate electric fields of different intensities, and thereby generating different arrangements of liquid crystal molecules. Although the method can mitigate the phenomenon of color shift, it tends to result in the resistance-capacitance (RC) delay effect and thus causing distorted image and poor display quality.

Another method is adding one more transistor in one single pixel unit. In other words, one single pixel unit has two transistors. The two transistors make the pixel electrode in the single pixel unit generate different electric fields and thus generating different arrangements of liquid crystal molecules and thereby eliminating color shift. Nevertheless, the method requires two transistors to be formed in one single pixel unit and more conductive lines to be added (such as scan lines) so that the fabricating process is made complicated and the fabricating cost higher as well.

SUMMARY OF THE INVENTION

The embodiments of present invention provide solution to improve the display quality of a liquid crystal display (LCD) device.

The embodiments of the invention further provide LCD panels including the active matrix substrates with characteristics of stable multi-domain and wide viewing angle.

The embodiments of the invention further provide active matrix substrates to mitigate the problem of color shift.

The embodiments of the invention further provide LCD panels including the active matrix substrates so as to mitigate the problem of color shift.

One embodiment of the invention provides an active matrix substrate including a substrate, a plurality of scan lines, a plurality of data lines and a plurality of pixel units. The scan lines, the data lines and the pixel units are all disposed over the substrate. Each of the pixel units includes an active component, a pixel electrode electrically connected with the active component and an auxiliary electrode. The active components are electrically connected with the scan lines and the data lines. The pixel electrode has at least one opening extended from an edge of the pixel electrode to the interior of the pixel electrode. The auxiliary electrode is electrically connected with a pixel electrode controlled by a previous scan line and includes a body portion and at least one extending portion disposed in the openings. The pixel electrode is electrically connected with the auxiliary electrode of a pixel unit controlled by a next scan line.

The other embodiment of the invention further provides an active matrix substrate including a substrate, a plurality of scan lines, a plurality of data lines and a plurality of pixel units. The scan lines, the data lines and the pixel units are all disposed over the substrate. Each of the pixel units includes an active component, a pixel electrode electrically connected with the active component and a plurality of auxiliary electrodes. The active components are electrically connected with the scan lines and the data lines. The pixel electrode has a plurality of openings extended from an edge of the pixel electrode to an interior of the pixel electrode. A portion of the auxiliary electrodes are electrically connected with the pixel electrode controlled by a next scan line, and a remaining portion of the auxiliary electrodes are electrically connected with the pixel electrode controlled by a previous scan line. Each of the auxiliary electrodes includes an extending portion disposed in one of the openings.

Another embodiment of the present invention further provides an LCD panel including the above-mentioned active matrix substrate(s), an opposite substrate and a liquid crystal layer. The opposite substrate is located over the active matrix substrate, and the liquid crystal layer is disposed between the active matrix substrate and the opposite substrate.

With the auxiliary electrodes of the active component, the liquid crystal molecules in the same pixel unit are formed as stable multi-domain including 4-domain and 2-domain on the pixel electrode since the voltage polarities of the pixel electrode and the auxiliary electrode are different. The LCD panel of the invention thus obtains the characteristics of stable multi-domain and wide viewing angle, and the problem of color shift is simultaneously mitigated as well. In addition, since no additional active component or conductive line is required for each of the pixel units, the present invention has the advantages of a simple fabricating process and a low fabricating cost as compared with the prior art.

In order to the make the aforementioned and other objects, features and advantages of the embodiments of present invention more comprehensible, preferred embodiments accompanied with figures are described in detail below.

DESCRIPTION OF EMBODIMENTS

The First Embodiment

Figure 1A:
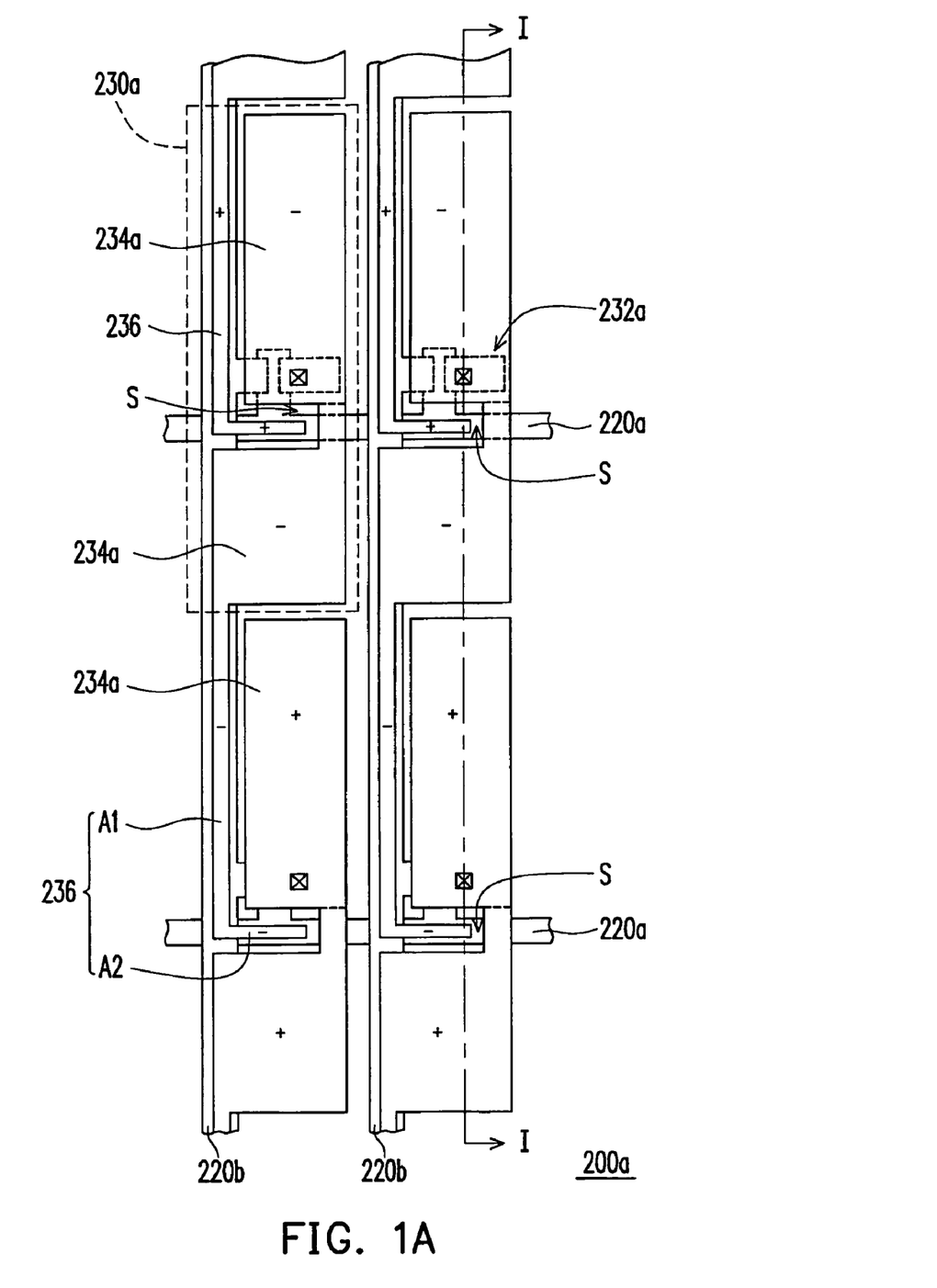
FIG. 1A illustrates a schematic top view of the active matrix substrate according to the first embodiment of the present invention.
Figure 1B:
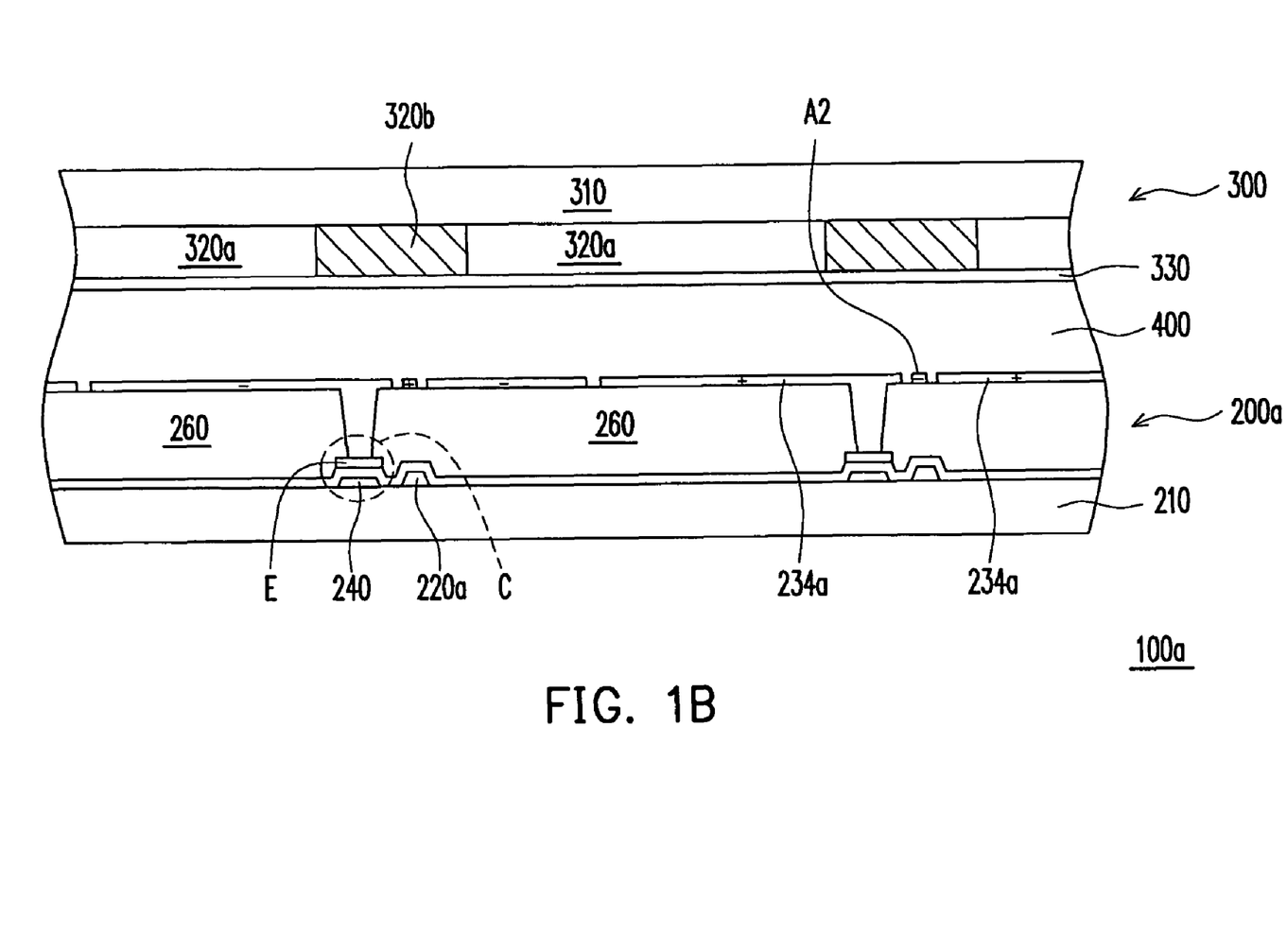
FIG. 1B illustrates a schematic cross-sectional view of the LCD panel of the first embodiment of the invention.

FIG. 1A illustrates a schematic top view of the active matrix substrate of the first embodiment of the invention. FIG. 1B illustrates a schematic cross-sectional view of the liquid crystal display (LCD) panel of the first embodiment of the invention. An active matrix substrate 200a as shown in FIG. 1B is a cross-sectional view obtained from FIG. 1A along line I-I. Referring to both FIGS. 1A and 1B, an LCD panel 100a of the present embodiment includes an active matrix substrate 200a, an opposite substrate 300 and a liquid crystal layer 400. The opposite substrate 300 is disposed over the active matrix substrate 200a, and the liquid crystal layer 400 is disposed between the active matrix substrate 200a and the opposite substrate 300, as shown in FIG. 1B.

The active matrix substrate 200a includes a substrate 210, a plurality of scan lines 220a, a plurality of data lines 220b and a plurality of pixel units 230a. The scan lines 220a, the data lines 220b and the pixel units 230a are all disposed over the substrate 210. Each of the pixel units 230a includes an active component 232a, a pixel electrode 234a and an auxiliary electrode 236. The active components 232a are electrically connected with the scan lines 220a and the data lines 220b, and the active component 232a is, for example, an amorphous silicon thin film transistor (a-Si TFT) or a polysilicon TFT. Each of the active components 232a is electrically connected with one of the pixel electrodes 234a correspondingly. Thus, the active component 232a can control the corresponding pixel electrode 234a.

The pixel electrode 234a has a opening S extended from an edge of the pixel electrode 234a to an interior of the pixel electrode, and is electrically connected with the auxiliary electrode 236 of an adjacent pixel unit 230a. The pixel electrode 234a of the adjacent pixel unit 230a is controlled by a next scan line 220a. In other words, each of the auxiliary electrodes 236 in a corresponding pixel unit 230a is electrically connected with a pixel electrode 234a controlled by a previous scan line 220a in an adjacent pixel unit 230a. Furthermore, the auxiliary electrode 236 includes a body portion A1 and an extending portion A2 disposed in the openings S. The pixel electrode 234a and the auxiliary electrode 236 can be fabricated using transparent conductive materials, such as indium tin oxide (ITO) or indium zinc oxide (IZO).

The LCD panel 100a is driven, for example, by the line inversion driving technique. When the LCD panel 100a is driven, a voltage polarity of the pixel electrode 234a in the same pixel unit 230a is contrary to voltage polarities of the pixel electrodes 234a controlled by a previous and a next scan lines 220a. Since the pixel electrode 234a in one corresponding pixel unit 230a is electrically connected with the auxiliary electrode 236 in an adjacent pixel unit 230a, the voltages of the pixel electrode 234a and the auxiliary electrode 236 in the adjacent pixel unit 230a are the same. Therefore, the voltage polarities of the pixel electrode 234a and the auxiliary electrode 236 in the same corresponding pixel unit 230a are contrary to each other. In the same pixel unit 230a; for instance, when the pixel electrode 234a has positive voltage polarity, the auxiliary electrode 236 has negative voltage polarity and vice versa.

It is known from the aforementioned and FIG. 1A that the pixel electrode 234a can be further identified as two portions by the opening S of the pixel electrode 234a. One portion is partially or fully surrounded by two auxiliary electrode 236 with a different voltage polarity and by a previous pixel electrode 234a controlled by the previous scan line 220a. As a result, the liquid crystal molecules corresponding to the portion mentioned above would form 4-domain effect. The other portion is located between an extending portions A2 of an auxiliary electrode 236 with a different voltage polarity and a pixel electrode 234a controlled by the next scan line 220a. As a result, the liquid crystal molecules corresponding to the other portion mentioned above would form 2-domain effect. Hence, in one single pixel unit 230a, the liquid crystal molecules would form as stable multi-domain including 4-domain and 2-domain because the voltage polarities of the pixel electrode 234a and the auxiliary electrode 236 are different. The LCD panel 100a can thus achieve the effect of stable multi-domain and obtain the characteristic of wide viewing angle, thereby mitigating the problem of color shift.

The extending directions of the openings S may be substantially the same. In other words, the openings S may extend from the same side of the pixel electrode 234a to the interior of the pixel electrode and are substantially parallel to each other. If the openings S are parallel to each other, the extending portions A2 inside of them can also be parallel to each other. In addition, the openings S may substantially parallel the scan lines 220a as well, as shown in FIG. 1A.

However, in the present embodiment, even if the extending directions of the openings S differ from each other, the overall performance of the active matrix substrate 200a would not be significantly affected. In other words, even if the openings S do not parallel each other, the active matrix substrate 200a still possesses the characteristic of wide viewing angle. Hence, the openings S shown in FIG. 1A only serve as examples to facilitate illustration and are not intended to limit the present invention.

In the present embodiment, the active matrix substrate 200a includes a plurality of conductive layers 240 located under source/drain E of the active components 232a. The conductive layers 240 may be fabricated using metallic materials, ITO or IZO. Each of the conductive layers 240 is electrically coupled to one of the sources/drains E correspondingly so as to form a storage capacitor C. With the storage capacitors C, the display quality of the LCD panel 100a is enhanced. Furthermore, each of the conductive layers 240 may be a common line formed on the active matrix substrate 200a.

The active matrix substrate 200a further includes a planarization layer 260 as shown in FIG. 1B. In one preferred embodiment, the thickness of the planarization layer 260 is 2-3 micrometers (μm). A plurality of pixel electrodes 234a and auxiliary electrodes 236 are disposed on the planarization layer 260. The planarization layer 260 is disposed on a substrate 210 covering a plurality of scan lines 220a, a plurality of data lines 220b and a plurality of active components 232a so as to avoid generating crosstalk resulted from parasitic capacitance.

Further, referring to FIG. 1B, the opposite substrate 300 of the embodiment may be a color filter substrate including a substrate 310, a plurality of color filter patterns 320a, a black matrix (BM) layer 320b and a common electrode 330.

The plurality of color filter patterns 320a and the BM layer 320b are disposed on the substrate 310. The common electrode 330 is disposed on the color filter patterns 320a and the BM layer 320b. The plurality of color filter patterns 320a includes a plurality of red filter patterns, green filter patterns and blue filter patterns. Moreover, the color filter patterns 320a may be fabricated using resin materials.

The BM layer 320b is located between the plurality of color filter patterns 320a. In the present embodiment, the LCD panel 100a may be a transmissive LCD. The BM layer 320b is suitable for covering the scan lines 220a, the data lines 220b and the active components 232a on the active matrix substrate 200a so as to prevent the display quality of the LCD panel 100a from being deteriorated. Moreover, the BM layer 320b may be fabricated using resin materials or metals.

The Second Embodiment

Figure 2A:
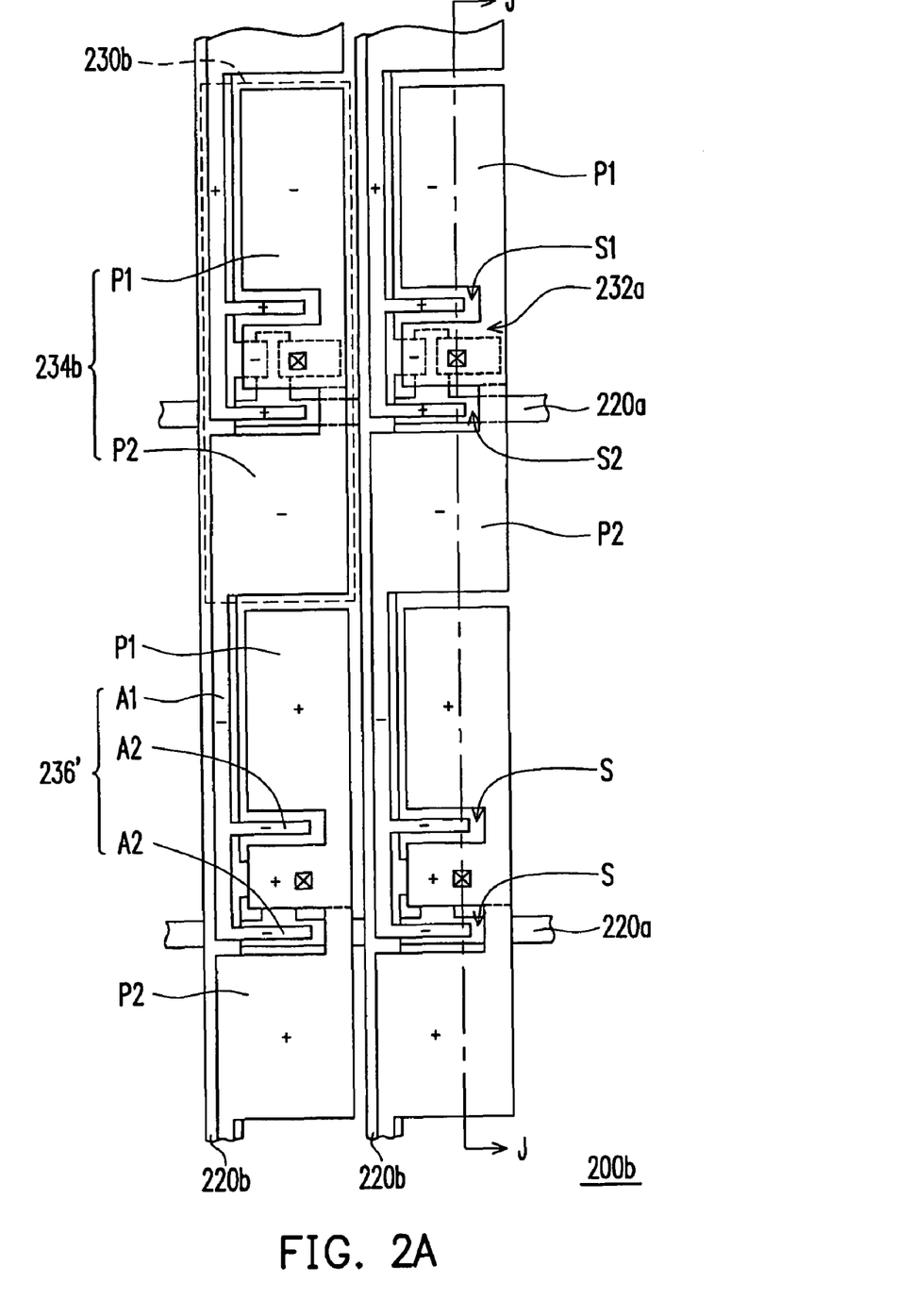
FIG. 2A illustrates a schematic top view of the active matrix substrate according to the second embodiment of the invention.
Figure 2B:
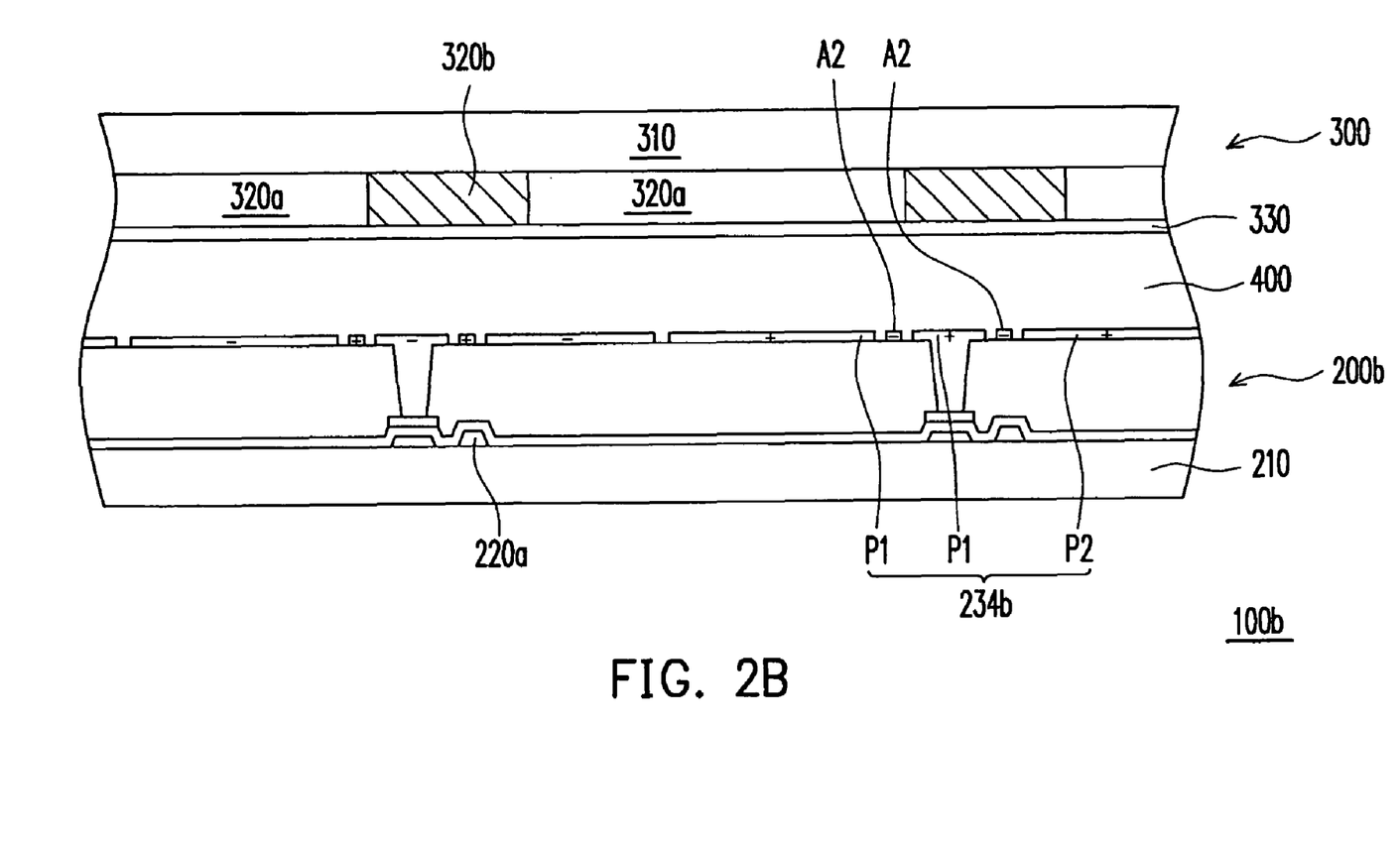
FIG. 2B illustrates a schematic cross-sectional view of the LCD panel according to the second embodiment of the invention.
Figure 2C:
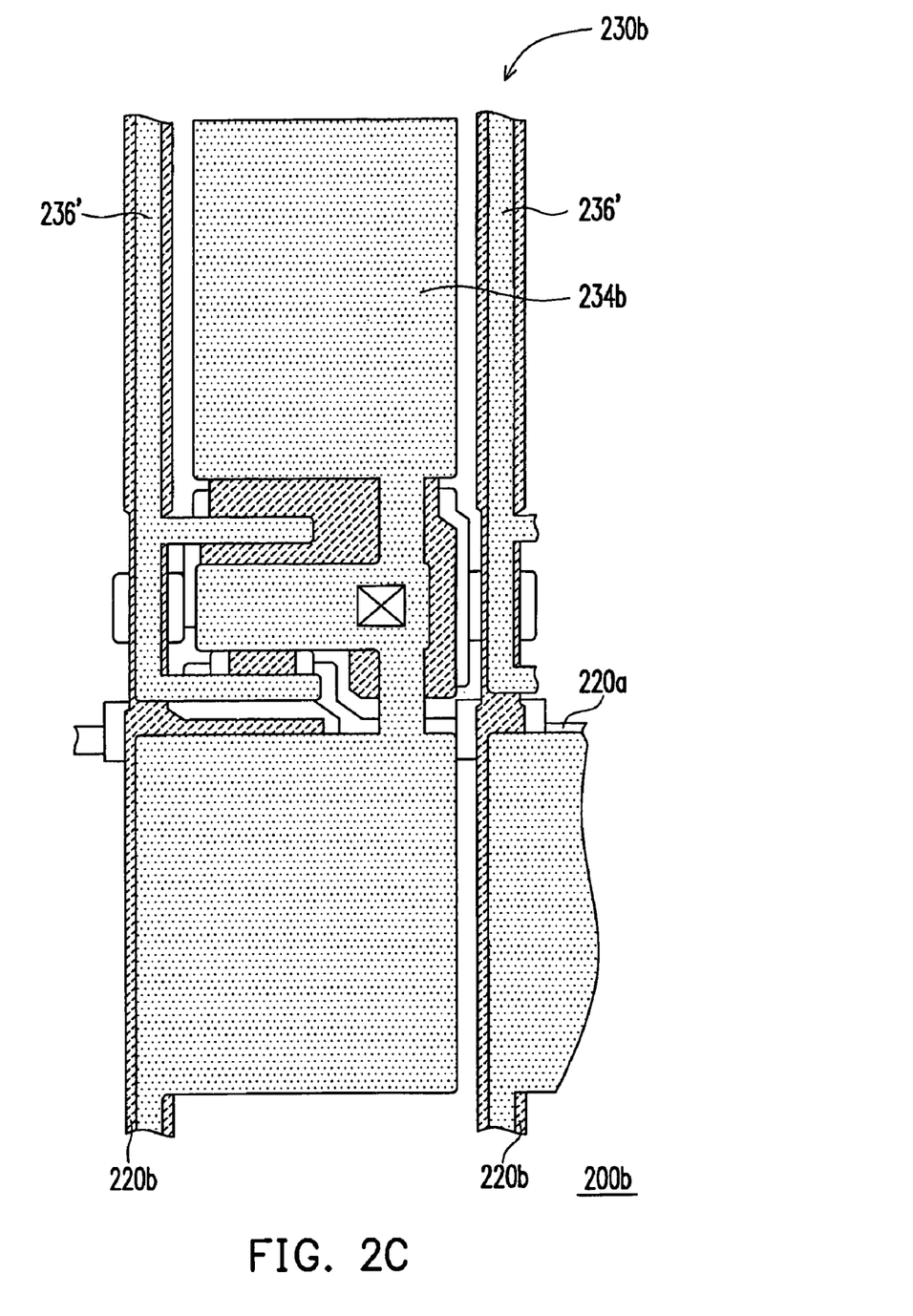
FIG. 2C illustrates a top view of an actual layout of the active matrix substrate in the pixel unit of FIG. 2A.

FIG. 2A illustrates a schematic top view of the active matrix substrate according to the second embodiment of the invention. FIG. 2B illustrates a schematic cross-sectional view of the LCD panel according to the second embodiment of the invention. FIG. 2B is a cross-sectional view of the active matrix substrate 200b obtained from FIG. 2A along line J-J. FIG. 2C illustrates a top view of an actual layout of the active matrix substrate in the pixel unit of FIG. 2A. Referring to both FIGS. 2A, 2B and 2C, the present embodiment is similar to the first one. The primary difference between the two embodiments lies in that an LCD panel 100b includes an active matrix substrate 200b having a plurality of pixel units 230b. Each of the pixel units 230b includes an active component 232a, a pixel electrode 234b and an auxiliary electrode 236'.

Specifically, in the same pixel unit 230b, the pixel electrode 234b has a plurality of openings S extended from an edge of the pixel electrode 234b to an interior of the pixel electrode 234b. The auxiliary electrode 236' includes a body portion A1 and a plurality of extending portions A2 disposed in the openings S respectively.

In the embodiment, the pixel electrode 234b in the same pixel unit 230b has two openings S and includes a first electrode portion P1 and a second electrode portion P2 electrically connected with the first electrode portion P1. The two openings S is a first opening S1 and a second opening S2. The first electrode portion P1 has the first opening S1, and the second opening S2 is located between the first electrode portion P1 and the second electrode portion P2.

In the same pixel unit 230b, the plurality of extending portions A2 of the auxiliary electrode 236' is respectively disposed in the first opening S1 and the second opening S2. In the pixel units 230b of the same column, each of the first electrode portions P1 is located between two adjacent body portions A1. Therefore, the two adjacent auxiliary electrodes 236' and a previous pixel electrode 234b surround each of the first electrode portions P1.

In the pixel units 230b of the same column, each of the second electrode portions P2 is located between the extending portions A2 of the auxiliary electrode 236' and the pixel electrode 234b controlled by a next scan line 220a. In detail, each of the second electrode portions P2 is located between one of the extending portions A2 in same pixel unit 230b and the first electrode portion P1 of a pixel electrode 234b controlled by a next scan line in next pixel unit 230b.

Further, in the same pixel unit 230b, the active component 232a is located under the pixel electrode 234b. Specifically, the active component 232a may be under the first electrode portion P1 and located between the first opening S1 and the second opening S2. However, each of the active components in the embodiment may also be Linder the second electrode portion P2 of one of the pixel electrodes 234b. Accordingly, dispositions of every active component 232a disclosed in FIGS. 2A and 2B only serve as examples to facilitate illustration, and are not intended to limit the present invention.

The extending directions of the openings S (the first opening S1 and the second opening S2) can be the same. Alternatively speaking, the first opening S1 and the second opening S2 may extend from the same side of the pixel electrode 234b to an interior of the pixel electrode 234b, and the S1 and S2 are parallel to each other. If the first openings S1 and the second openings S2 are parallel to each other, so are the first openings S1 and the extending portions A2 in the second openings S2. Additionally, the first openings S1 and the second openings S2 may parallel the scan lines 220a as well, as shown in FIG. 2A.

However, in the present embodiment, even if the extending directions of the first openings S1 and the second openings S2 differ, the overall performance of the active matrix substrate 200b would not be affected. In other words, even if the first openings S1 and the second openings S2 do not parallel each other, the active matrix substrate 200b still possesses the characteristic of wide viewing angle. Hence, the first openings S1 and the second openings S2 shown in FIG. 2A only serve as examples to facilitate illustration, and are not intended to limit the invention.

The Third Embodiment

Figure 3A:
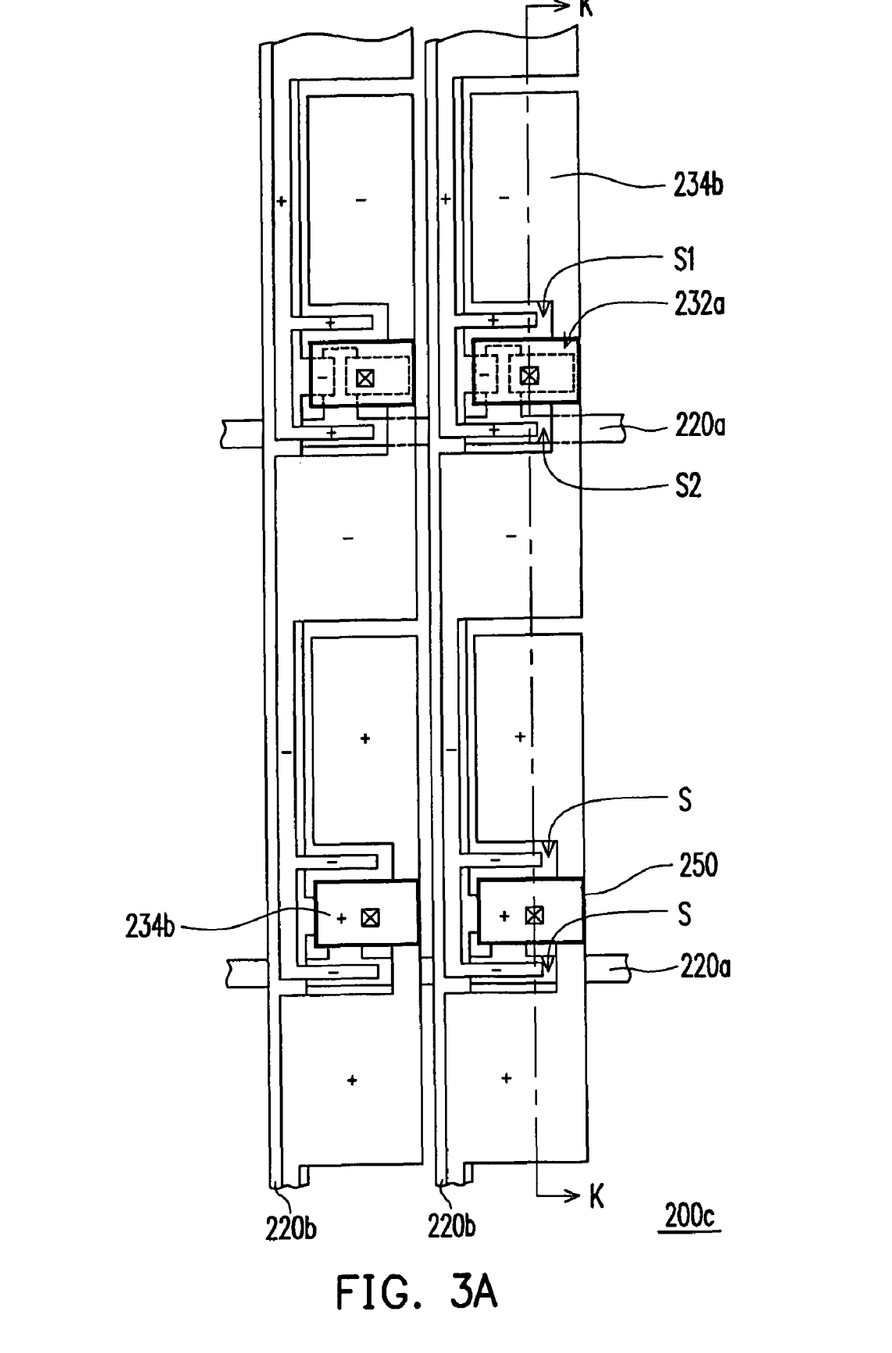
FIG. 3A illustrates a schematic top view of the active matrix substrate according to the third embodiment of the invention.
Figure 3B:
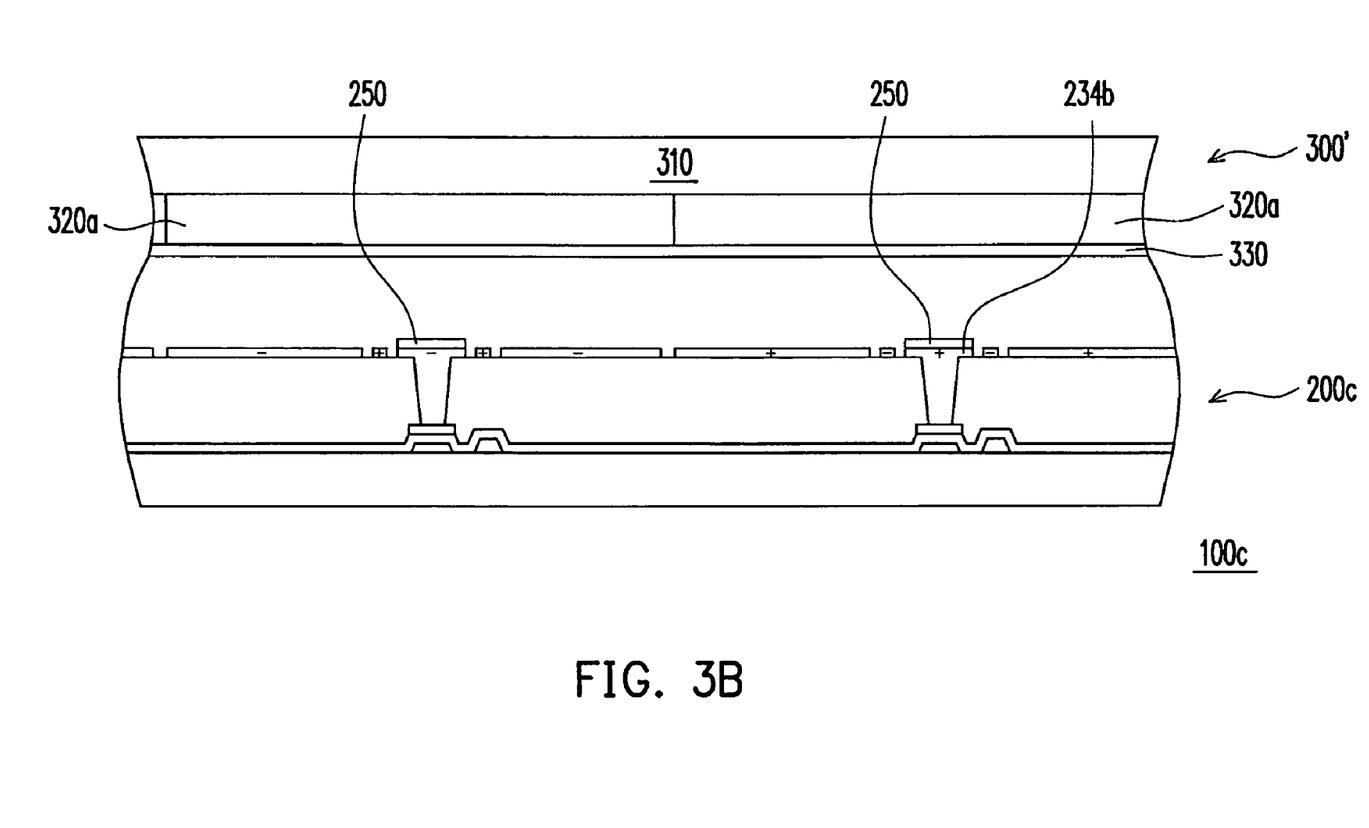
FIG. 3B illustrates a schematic cross-sectional view of the LCD panel according to the third embodiment of the invention.

FIG. 3A illustrates a schematic top view of the active matrix substrate according to the third embodiment of the invention. FIG. 3B illustrates a schematic cross-sectional view of the LCD panel according to the third embodiment of the invention. An active matrix substrate 200c as shown in FIG. 3B is a cross-sectional view obtained from FIG. 3A along line k-k. Referring to FIGS. 3A and 3B, the present embodiment is similar to the second one. The primary difference between the two embodiments lies in that an LCD panel 100c of the present embodiment is a transflective LCD panel. Specifically, in the LCD panel 100c of the embodiment, an active matrix substrate 200c further includes a plurality of reflective layers 250. The reflective layers 250 are respectively disposed on pixel electrodes 234b of the active matrix substrate 200c and located over active components 232a of the active matrix substrate 200c so as to reflect light outside of the LCD panel 100c.

In addition, an opposite substrate 300' of the LCD panel 100c is similar to the opposite substrate 300 of the previous first embodiment. Nevertheless, since the LCD panel 100c is a transmissive LCD panel, the opposite substrate 300' only includes a substrate 310, a plurality of color filter patterns 320a and a common electrode 330, and does not include a black matrix (BM) layer. Consequently, the light reflected from the reflective layers 250 may penetrate through the opposite substrate 300' and reveal bright and clear images.

The Fourth Embodiment

Figure 4A:
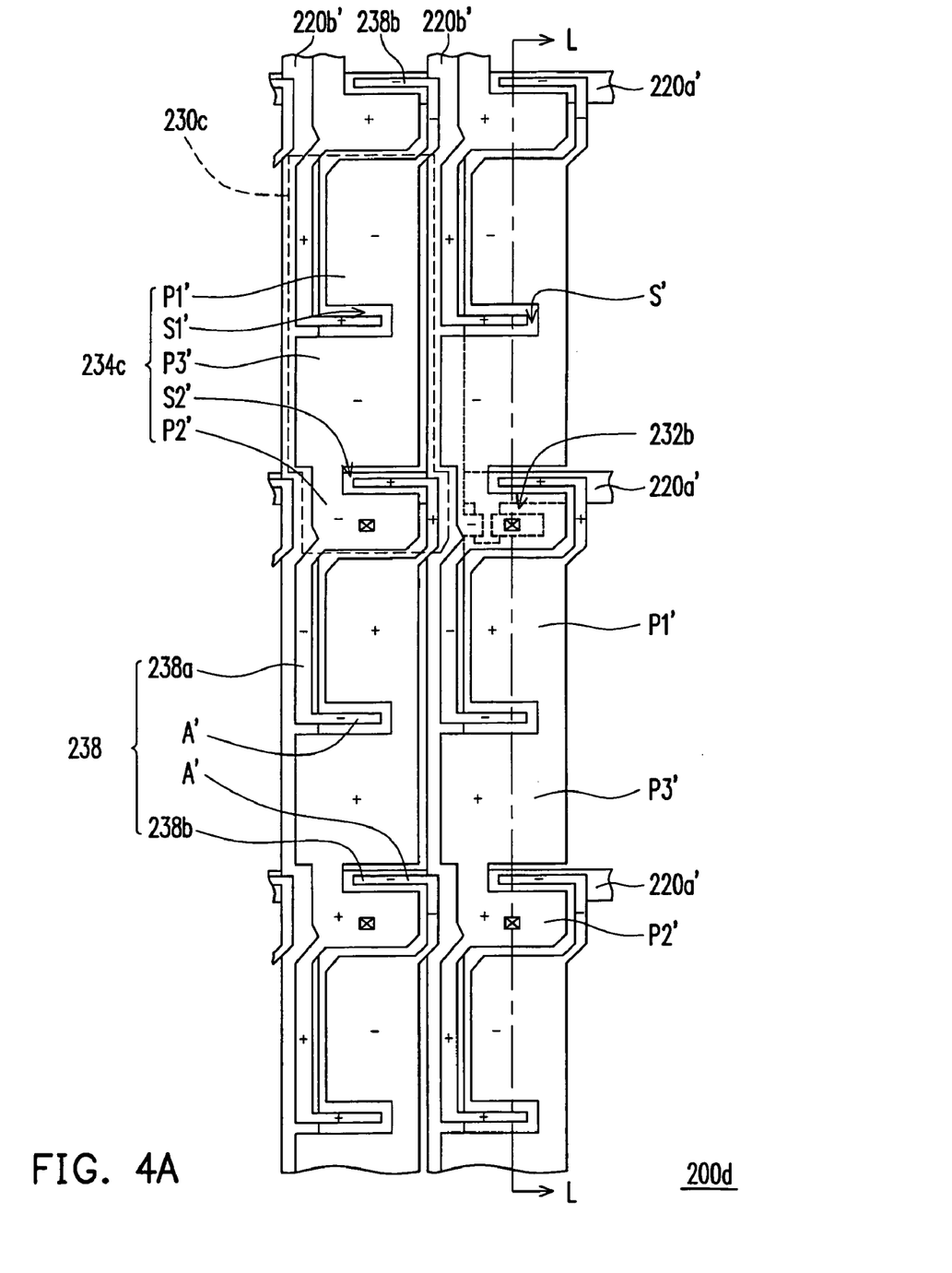
FIG. 4A illustrates a schematic top view of the active matrix substrate according to the fourth embodiment of the invention.
Figure 4B:
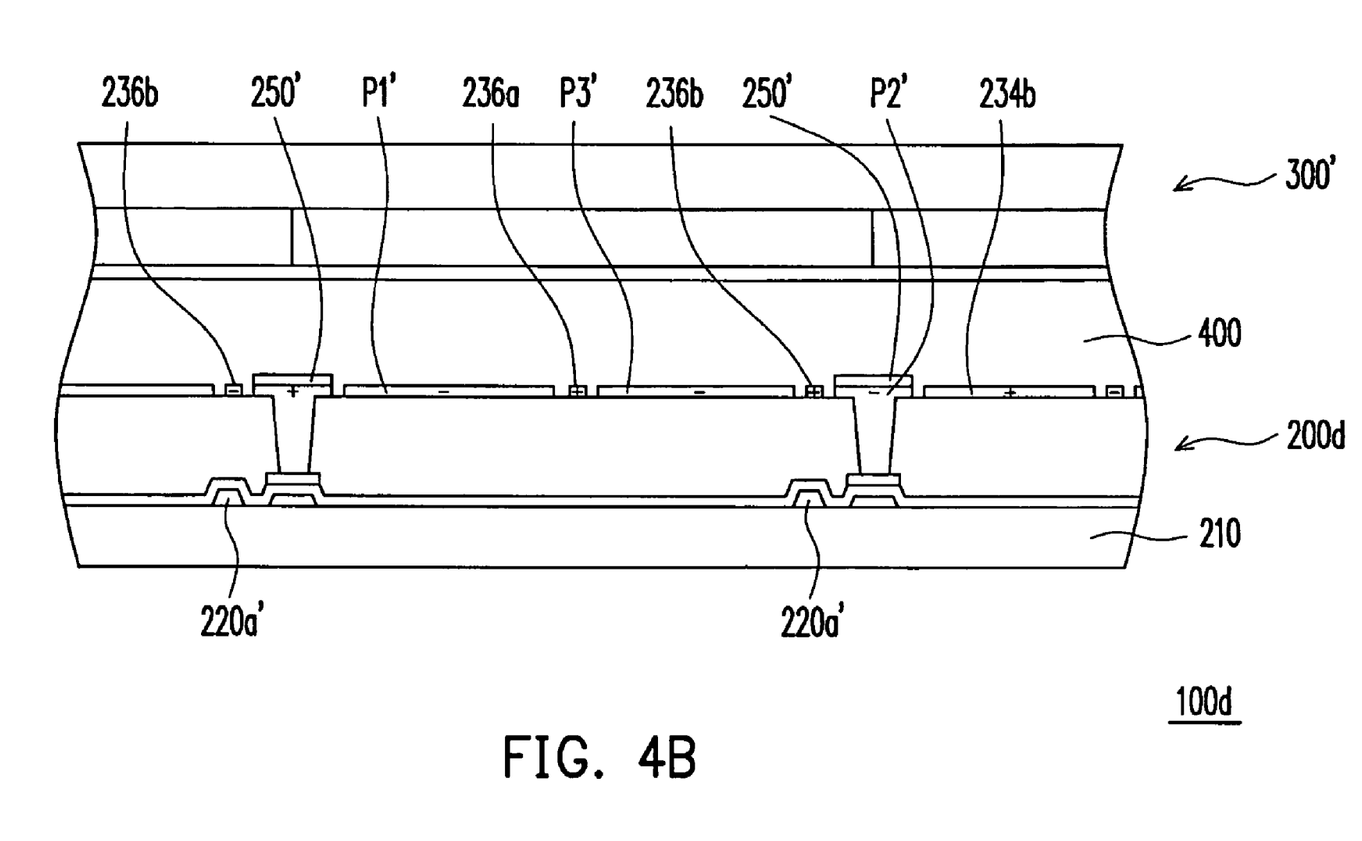
FIG. 4B illustrates a schematic cross-sectional view of the LCD panel according to the fourth embodiment of the invention.

FIG. 4A illustrates a schematic top view of the active matrix substrate according to the fourth embodiment of the invention. FIG. 4B illustrates a schematic cross-sectional view of the LCD panel of the fourth embodiment of the invention. An active matrix substrate 200d as shown in FIG. 4B is a cross-sectional view obtained from FIG. 4A along line L-L. Referring to both FIGS. 4A and 4B, an LCD panel 100d includes an active matrix substrate 200d, an opposite substrate 300' and a liquid crystal layer 400. The opposite substrate 300' is located over the active matrix substrate 200d, and the liquid crystal layer 400 is disposed between the opposite substrate 300' and the active matrix substrate 200d.

The active matrix substrate 200d includes a substrate 210, a plurality of scan lines 220a', a plurality of data lines 220b' and a plurality of pixel units 230c. The plurality of scan lines 220a', the plurality of data lines 220b' and the plurality of pixel units 230c are all disposed over the substrate 210. Each of the pixel units 230c includes an active component 232b, a pixel electrode 234c and a plurality of auxiliary electrodes 238. The active components 232b are electrically connected with the scan lines 220a' and the data lines 220b'. The active component 232b is, for example, an a-Si TFT or a poly-silicon TFT.

In the same pixel unit 230c, the pixel electrode 234c is electrically connected with the active component 232b and has a plurality of openings S' extended from an edge of the pixel electrode 234c to an interior of the pixel electrode 234c. A portion of the auxiliary electrodes 238 are electrically connected with the pixel electrode 234c controlled by a next scan line 220a'. A remaining portion of the auxiliary electrodes 238 are electrically connected with the pixel electrode 234c controlled by a previous scan line 220a'. Each of the auxiliary electrodes 238 includes an extending portion A' disposed in one of the openings S'. In addition, the pixel electrodes 234c and the auxiliary electrodes 238 may be fabricated using transparent conductive materials, such as indium tin oxide (ITO) or indium zinc oxide (IZO).

In the present embodiment, the pixel electrode 234c in the same pixel unit 230c includes a first electrode portion P1', a second electrode portion P2' and a third electrode portion P3'. The third electrode portion P3' is located between the first electrode portion P1' and the second electrode portion P2' and is electrically connected with the first electrode portion P1' and the second electrode portion P2'. The openings S' in the same pixel unit 230c may be a first opening S1' and a second opening S2'. The first opening S1' is located between the first electrode portion P1' and the third electrode portion P3'. The second opening S2' is located between the second electrode portion P2' and the third electrode portion P3'. Hence, each of the third electrode portions P3' is disposed between two extending portions A'.

The same pixel unit 230c includes two auxiliary electrodes 238. The two auxiliary electrodes 238 are a first auxiliary electrode 238a and a second auxiliary electrode 238b. The first auxiliary electrode 238a is electrically connected with the second electrode portion P2' of a previous pixel electrode 234c. The second auxiliary electrode 238b is electrically connected with the first electrode portion P1' of a pixel electrode 234c controlled by a next scan line. In the pixel electrodes 234c arranged in the same column, each of the first auxiliary electrodes 238a stretches out from the second electrode portion P2' of a previous pixel electrode 234c with which it is electrically connected to an interior of the first opening S1'. Each of the second auxiliary electrodes 238b extends from the first electrode portion P1' of a pixel electrode 234c with which it is electrically connected to an interior of the second opening S2'. Consequently, each of the second electrode portions P2' is surrounded by a second auxiliary electrode 238b and the first electrode portion P1' of a pixel unit 230c, as shown in FIG. 4A. Each of the first electrode portions P1' is surrounded by a first auxiliary electrode 238a and a second electrode portion P2' of a previous pixel unit 230c, as shown in FIG. 4A as well.

The LCD panel 100d is driven by the line inversion technique as the foregoing embodiment. Therefore, a voltage polarity of each of the pixel electrodes 234c is contrary to a voltage polarity of the pixel electrodes 234c controlled by a previous scan line 220a' or controlled by a next scan line 220a'. Since each of the first auxiliary electrodes 238a and each of the second auxiliary electrodes 238b are electrically connected with a previous and a next pixel electrodes 234c respectively, in the same pixel unit 230c, voltage polarities of the auxiliary electrodes 238 are both the same and contrary to the voltage polarity of the pixel electrode 234c. For example, when the pixel electrode 234c has a positive voltage polarity, the surrounding auxiliary electrodes 238 have a negative voltage polarity, as shown in FIG. 4A. Accordingly, liquid crystal molecules in the same pixel unit 230c would form as stable multi-domain over the pixel electrode 234c, thereby rendering the LCD panel 100d with the characteristic of wide viewing angle so as to mitigate the problem of color shift. For instance, when the first electrode portion P1' with negative voltage polarity is surrounded by auxiliary electrodes 238 with positive voltage polarity and by a second electrode portion P2' of an adjacent pixel unit with positive voltage polarity, liquid crystal molecules in first electrode portion P1' would form as 4-domain. The second electrode portion P2' also has 4-domain effect. The third electrode portion P3' has 2-domain effect.

In the present embodiment, the extending directions of the openings S' may be contrary. For example, the first openings S1' and the second openings S2' may extend from the two opposite sides of the pixel electrode 234c to an interior of the pixel electrode 234c, and S1' and S2' are parallel to each other. Hence, the extending portions A' of the auxiliary electrodes 238 may also be parallel to each other. Moreover, the first openings S1' and the second openings S2' may also parallel the scan lines 220b'. However, even if the extending directions of the openings S' are not contrary, or even they are the same, the overall performance of the active matrix substrate 200d in the present embodiment would not be affected. In other words, if the extending directions of the first openings S1' and the second openings S2' are the same, the active matrix substrate of the embodiment would also have the characteristic of wide viewing angle. Thus, the openings S' shown in FIG. 4A only serve as examples to facilitate illustration and are not intended to limit the present invention.

Further, in the same pixel unit 230c, the active component 232b is located under the pixel electrode 234c. For example, the active component 232b may be located under the first electrode portion P1', the second electrode portion P2' and the third electrode portion P3'. Although each of the active components 232b is located under the second electrode portion P2' as disclosed in FIG. 4A, FIG. 4A simply serves as an example for illustration and is not intended to limit the invention.

Besides, the LCD panel 100d of the embodiment may be a transflective LCD panel. Specifically, the active matrix substrate 200d further includes a plurality of reflective layers 250' to reflect light from outside of the LCD panel 100d. The reflective layers 250' are disposed on the pixel electrodes 234c respectively and located over one of the active components correspondingly. Taking FIGS. 4A and 4B as examples, one of the reflective layers 250' is located on one of the second electrode portions P2'.

Nevertheless, the LCD panel 100d may also be fabricated as a transmissive LCD panel, and thus the reflective layers 250' are not necessary elements for the LCD panel 100d. Alternatively speaking, the active matrix substrate 200d of the embodiment can do without the reflective layers 250'. Therefore, the opposite substrate 300' may also be replaced with an opposite substrate having a BM layer. The reflective layers 250' of FIG. 4B and the opposite substrate 300' are simply examples to facilitate illustration and are not intended to limit the invention.

In summary, the liquid crystal molecules in the same pixel unit are formed as multi-domain on the pixel electrodes by at least one auxiliary electrode in the present invention, thereby rendering the LCD panel with the characteristic of wide viewing angle. The display quality is also simultaneously improved by the aligning effect derived from stable multi-domain and the mitigation of color shift achieved in the invention. Furthermore, the problem of color shift is mitigated without additional active component or line required for the active matrix substrate of the invention. Consequently, the invention possesses the advantages of a simple fabricating process and a low fabricating cost over the prior art.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active matrix substrate, comprising:
   a substrate;
   a plurality of scan lines disposed on the substrate;
   a plurality of data lines disposed on the substrate;
   a plurality of pixel units disposed on the substrate, each of the pixel units comprising:
   an active component electrically connected with one of the scan lines and one of the data lines correspondingly;
   a first pixel electrode electrically connected with the active component and having a first voltage polarity, wherein the first pixel electrode has at least one opening extended from an edge of the first pixel electrode to an interior of the first pixel electrode; and
   an first auxiliary electrode electrically connected with a second pixel electrode of an adjacent pixel unit, the second pixel electrode being controlled by a previous scan line and the auxiliary electrode having a second voltage polarity contrary to the first voltage polarity, wherein the first auxiliary electrode comprises a body portion and at least one extending portion disposed in the opening, and the first pixel electrode is electrically connected with a second auxiliary electrode of another adjacent pixel unit having a third pixel electrode controlled by a next scan line.

2. The active matrix substrate of claim 1, wherein the second auxiliary electrode has the first voltage polarity and the third pixel electrode has the second voltage polarity.

3. The active matrix substrate of claim 2, wherein the first pixel electrode comprises a first electrode portion and a second electrode portion electrically connected with the first electrode portion, the first electrode portion being surrounded by the first auxiliary electrode, the second pixel electrode, and another auxiliary electrode with second voltage polarity of one adjacent pixel unit.

4. The active matrix substrate of claim 3, wherein the extending portion of the first auxiliary electrode and the third pixel electrode respectively located near two opposite sides of the second electrode portion.

5. The active matrix substrate of claim 1, wherein the first pixel electrode has a plurality of openings extended from the edge of the first pixel electrode to the interior of the first pixel electrode, and the first auxiliary electrode comprises a plurality of extending portions disposed in the openings respectively.

6. The active matrix substrate of claim 5, wherein the first pixel electrode comprises a first electrode portion and a second electrode portion electrically connected with the first electrode portion, and the openings comprise a first opening and a second opening, the first electrode portion having the first opening, the second opening located between the first electrode portion and the second electrode portion.

7. The active matrix substrate of claim 6, wherein in the same pixel unit, the active component is disposed under the first electrode portion and located between the first opening and the second opening.

8. The active matrix substrate of claim 1, wherein each of the pixel units further comprises a reflective layer, disposed on the first pixel electrode and located over the active component.

9. The active matrix substrate of claim 1, wherein each of the active components comprises an amorphous silicon thin film transistor (a-Si TFT) or a poly-silicon TFT.

10. A liquid crystal display (LCD) panel, comprising:
    an active matrix substrate, comprising:
    a substrate;
    a plurality of scan lines disposed on the substrate;
    a plurality of data lines disposed on the substrate;
    a plurality of pixel units disposed on the substrate, each of the pixel units comprising:
    an active component electrically connected with one of the scan lines and one of the data lines correspondingly;
    a pixel electrode electrically connected with the active component, wherein the pixel electrode has at least one opening extended from an edge of the pixel electrode to an interior of the pixel electrode;
    an auxiliary electrode electrically connected with the pixel electrode controlled by a previous scan line, wherein the auxiliary electrode comprises a body portion and at least one extending portion disposed in the openings, and the pixel electrode is electrically connected with the auxiliary electrode of an adjacent pixel unit, the pixel electrode of the adjacent pixel unit being controlled by a next scan line;

an opposite substrate disposed over the active matrix substrate; and a liquid crystal layer disposed between the active matrix substrate and the opposite substrate.

11. The LCD panel of claim 10, wherein in the same pixel unit, a voltage polarity of the pixel electrode is contrary to a voltage polarity of the auxiliary electrode.

12. The LCD panel of claim 10, wherein in the pixel units of the same column, a voltage polarity of each of the pixel electrodes is the same as a voltage polarity of the auxiliary electrode of the pixel unit controlled by a next scan line.

13. The LCD panel of claim 10, wherein extending directions of the openings are the same.

14. The LCD panel of claim 10, wherein the pixel electrode has a plurality of openings extended from the edge of the pixel electrode to the interior of the pixel electrode, and the auxiliary electrode comprises a plurality of extending portions disposed in the openings respectively.

15. The LCD panel of claim 14, wherein in the same pixel unit, the pixel electrode comprises a first electrode portion and a second electrode portion electrically connected with the first electrode portion, and the openings comprise a first opening and a second opening, the first electrode portion having the first opening, the second opening located between the first electrode portion and the second electrode portion.

16. The LCD panel of claim 15, wherein in the same pixel unit, the active component is located under the first electrode portion and located between the first opening and the second opening.

17. The LCD panel of claim 10, further comprising a plurality of reflective layers, disposed on the pixel electrodes and located over the active components.

18. The LCD panel of claim 10, wherein each of the active components comprises an a-Si TFT or a poly-silicon TFT.

19. An active matrix substrate, comprising:
a substrate;
a plurality of scan lines disposed on the substrate;
a plurality of data lines disposed on the substrate;
a plurality of pixel units disposed on the substrate, each of the pixel units comprising:
an active component electrically connected with one of the scan lines and one of the data lines correspondingly;
a pixel electrode electrically connected with the active component, wherein the pixel electrode has a plurality of openings extended from an edge of the pixel electrode to an interior of the pixel electrode; and
a plurality of auxiliary electrodes, wherein a portion of the auxiliary electrodes are electrically connected with the pixel electrode controlled by a next scan line, a remaining portion of the auxiliary electrodes are electrically connected with the pixel electrode controlled by a previous scan line, and each of the auxiliary electrodes comprises an extending portion disposed in one of the openings.

20. The active matrix substrate of claim 19, wherein in the same pixel unit, voltage polarities of the auxiliary electrodes are the same and a voltage polarity of the pixel electrode is contrary to the voltage polarities of the auxiliary electrodes.

21. The active matrix substrate of claim 19, wherein extending directions of the openings are contrary.

22. The active matrix substrate of claim 19, further comprising a plurality of reflective layers, disposed on the pixel electrodes and located over the active components.

23. The active matrix substrate of claim 19, wherein in the same pixel unit, the pixel electrode comprises a first electrode portion, a second electrode portion and a third electrode portion, the third electrode portion is electrically connected between the first electrode portion and the second electrode portion, and the openings comprise a first opening between the first electrode portion and the third electrode portion and a second opening between the second electrode portion and the third electrode portion.

24. The active matrix substrate of claim 23, wherein each of the active components is located under one of the second electrode portions respectively.

25. The active matrix substrate of claim 19, wherein each of the active components comprises an a-Si TFT or a poly-silicon TFT.

26. An LCD panel, comprising:
an active matrix substrate, comprising:
a substrate;
a plurality of scan lines disposed on the substrate;
a plurality of data lines disposed on the substrate;
a plurality of pixel units disposed on the substrate, each of the pixel units comprising:
an active component electrically connected with one of the scan lines and one of the data lines correspondingly;
a pixel electrode electrically connected with the active component, wherein the pixel electrode has a plurality of openings extended from an edge of the pixel electrode to an interior of the pixel electrode;
a plurality of auxiliary electrodes, wherein a portion of the auxiliary electrodes are electrically connected with the pixel electrode controlled by a next scan line, a remaining portion of the auxiliary electrodes are electrically connected with the pixel electrode controlled by a previous scan line, and each of the auxiliary electrodes comprises an extending portion disposed in one of the openings;
an opposite substrate disposed over the active matrix substrate; and
a liquid crystal layer disposed between the active matrix substrate and the opposite substrate.

27. The LCD panel of claim 26, wherein in the same pixel unit, voltage polarities of the auxiliary electrodes are the same and a voltage polarity of the pixel electrode is contrary to the voltage polarities of the auxiliary electrodes.

28. The LCD panel of claim 26, wherein extending directions of the openings are contrary.

29. The LCD panel of claim 26, further comprising a plurality of reflective layers, disposed on the pixel electrodes and located over the active components.

30. The LCD panel of claim 26, wherein in the same pixel unit, the pixel electrode comprises a first electrode portion, a second electrode portion and a third electrode portion, the third electrode portion is electrically connected between the first electrode portion and the second electrode portion, and the openings comprise a first opening between the first electrode portion and the third electrode portion and a second opening between the second electrode portion and the third electrode portion.

31. The LCD panel of claim 30, wherein each of the active components is located under one of the second electrode portions respectively.

32. The LCD panel of claim 26, wherein each of the active components comprises an a-Si TFT or a poly-silicon TFT.

* * * * *